United States Patent
Mende et al.

(10) Patent No.: US 7,548,186 B2
(45) Date of Patent: Jun. 16, 2009

(54) METHOD AND APPARATUS FOR DETECTION OF AN ELECTROMAGNETIC SIGNAL REFLECTED FROM AND OBJECT

(75) Inventors: Ralph Mende, Braunschweig (DE); Marc Behrens, Königslutter (DE)

(73) Assignee: S.M.S. Smart Microwave Sensors GmbH, Braunschweig (DE)

( * ) Notice: Subject to any disclaimer, the term of this patent is extended or adjusted under 35 U.S.C. 154(b) by 0 days.

(21) Appl. No.: 11/203,439

(22) Filed: Aug. 15, 2005

(65) Prior Publication Data

US 2006/0033654 A1   Feb. 16, 2006

(30) Foreign Application Priority Data

Aug. 16, 2004   (DE) .................. 10 2004 040 015

(51) Int. Cl.
*G01S 13/48*   (2006.01)
*G01S 13/93*   (2006.01)

(52) U.S. Cl. .................. 342/149; 342/70; 342/157; 342/159; 342/380

(58) Field of Classification Search .......... 342/147, 342/149
See application file for complete search history.

(56) References Cited

U.S. PATENT DOCUMENTS

| | | | |
|---|---|---|---|
| 3,148,369 A * | 9/1964 | Zable et al. ................ 342/423 |
| 3,711,858 A | 1/1973 | Reeder et al. | |
| 3,943,511 A * | 3/1976 | Evans et al. ................ 342/94 |
| 4,023,172 A * | 5/1977 | Schmidt ..................... 342/94 |
| 4,335,388 A * | 6/1982 | Scott et al. .................. 342/379 |
| 4,389,649 A * | 6/1983 | Parkhurst et al. ........... 342/189 |
| 4,439,769 A * | 3/1984 | Masak ........................ 342/380 |
| 4,555,706 A * | 11/1985 | Haupt ......................... 342/81 |

(Continued)

FOREIGN PATENT DOCUMENTS

DE   196 27 218   7/1996

(Continued)

OTHER PUBLICATIONS

European Search Report dated Dec. 1, 2005.

(Continued)

*Primary Examiner*—Thomas H Tarcza
*Assistant Examiner*—Matthew M Barker
(74) *Attorney, Agent, or Firm*—Whitham, Curtis, Christofferson & Cook, P.C.

(57) ABSTRACT

For detection of an electromagnetic signal, which is transmitted from a transmitting antenna (1), by means of at least two at least essentially identical receiving antennas (3, 4), whose sensitivity curve has a maximum (M) with falling flanks as well as sidelobes (SL) adjacent to it with sensitivity increased again at a reception angle symmetrically with respect to a basic alignment, with angle determination for an object which reflects the transmitted signal being carried out by the two receiving antennas (3, 4) by phase determination in an unambiguous interval ($\theta_u$) whose boundaries (L) are predetermined by the distance (d) between the receiving antennas (3, 4), the distance (d) is chosen such that the boundaries (L) of the unambiguity area ($\theta_u$) intersect the sidelobes (SL), and the reflective object is detected by means of vectorial addition of the signals from the receiving antennas (3, 4), after which the parameters R, v are determined.

8 Claims, 5 Drawing Sheets

U.S. PATENT DOCUMENTS

| | | | | |
|---|---|---|---|---|
| 4,717,916 | A | * | 1/1988 | Adams et al. ............... 342/107 |
| 4,893,350 | A | * | 1/1990 | Minamisono et al. .... 455/278.1 |
| 4,931,977 | A | | 6/1990 | Klemes |
| 5,134,416 | A | * | 7/1992 | Cafarelli et al. ............. 342/372 |
| 5,173,700 | A | * | 12/1992 | Chesley ........................ 342/17 |
| 5,268,697 | A | * | 12/1993 | Sezai ......................... 342/427 |
| 5,434,578 | A | * | 7/1995 | Stehlik ....................... 342/383 |
| 5,493,307 | A | * | 2/1996 | Tsujimoto .................. 342/380 |
| 5,652,591 | A | * | 7/1997 | Liu et al. .................... 342/380 |
| 5,963,163 | A | | 10/1999 | Kemkemian et al. |
| 6,021,096 | A | * | 2/2000 | Schlieter et al. ............. 367/103 |
| 6,054,949 | A | * | 4/2000 | Grassmann ................. 342/383 |
| 6,292,129 | B1 | | 9/2001 | Matsugatani et al. |
| 6,377,212 | B1 | * | 4/2002 | Kinghorn et al. ............ 342/380 |
| 6,741,205 | B2 | * | 5/2004 | Nagasaku ................... 342/174 |
| 6,975,263 | B1 | * | 12/2005 | Lovsen ......................... 342/70 |
| 2003/0179128 | A1 | * | 9/2003 | Mende et al. ................. 342/70 |
| 2004/0119633 | A1 | * | 6/2004 | Oswald et al. ................ 342/70 |
| 2005/0156780 | A1 | * | 7/2005 | Bonthron et al. ............ 342/107 |

FOREIGN PATENT DOCUMENTS

| | | |
|---|---|---|
| DE | 100 50 278 | 4/2002 |
| EP | 0 544 081 | 6/1993 |

OTHER PUBLICATIONS

Merrill I. Skolnk, Editor in Chief; Radar Handbook;"Tracking Radar"; pp. 18.8-18.22; 1990.

Dr. Othmar Gotthard (Hrsg.); FM- und TV- Sendeantennen-systeme; pp. 41, 42 and 68; 1989.

* cited by examiner

METHOD AND APPARATUS FOR DETECTION OF AN ELECTROMAGNETIC SIGNAL REFLECTED FROM AND OBJECT

BACKGROUND OF THE INVENTION

1. Field of the Invention

The invention relates to a method for detection of an electromagnetic signal, which is transmitted from a transmitting antenna, by means of at least two at least essentially identical receiving antennas whose sensitivity curve has a maximum with falling flanks as well as sidelobes adjacent to it with sensitivity increased again at a reception angle symmetrically with respect to a basic alignment, with angle determination for an object which reflects the transmitted signal being carried out by the two receiving antennas by phase determination in an unambiguity area whose boundaries are predetermined by the distance between the receiving antennas.

The invention also relates to an apparatus having a transmitting antenna for transmission of an electromagnetic signal, and at least two essentially identical receiving antennas, whose sensitivity curve has a maximum with falling flanks as well as sidelobes adjacent to it with sensitivity increased again at a reception angle symmetrically with respect to a basic alignment, and having an evaluation device for determination of the phase differences of the signal which is received by the two receiving antennas and has been reflected by an object, in an unambiguity area which is predetermined by the distance between the receiving antennas.

2. Background Description

It is known for the angle of an object which reflects the transmission signal to be determined by determination of the phase offset between two received signals received by receiving antennas. The so-called phase monopulse method (Merrill I. Skoinik, Radar Handbook, Second Edition, McGraw Hill 1990, pages 18-9 et seqq. and 18-17 et seqq.) is illustrated in FIG. 1. The phase difference $\Delta\phi$ corresponds to a path length $\lambda/2\pi \cdot \Delta\phi$. When the two receiving antennas are aligned in the same way, the relationship is $\sin\theta = \lambda/2\pi \cdot \Delta\phi/d$.

The angle $\theta$ is thus given by:

$$\theta = \arcsin\frac{(\lambda\Delta\Phi)}{2\pi d}$$

The angle measurement is ambiguous when the phase difference is $\Delta\phi \geq \pi$ or $\Delta\phi \leq -\pi$. The area in which there is no ambiguity is the unambiguity area (Huder "Einführung in die Radartechnik" [Introduction to radar engineering] 1999, pages 146 to 148). Systems such as these are normally operated at radar wavelengths. A wavelength of $\lambda=12.43$ mm and a distance $d=14.55$ mm between the receiving antennas results in an unambiguity area of $\theta_u=\pm 25.39°$.

For an unambiguity area which is as large as possible, the distance d would have to be as small as possible. However, this would also result in very small receiving antennas which would not allow adequate beam formation of the received signals. For beam formation that is as good as possible, the receiving area of the receiving antennas must be chosen to be as large as possible. However, this would result in an unusably small unambiguity area. The sidelobes of the receiving antennae, in which the receiving antennas once again have increased sensitivity and thus produce strong signals from objects at the side which can interfere with the detection of useful signals within a relatively narrow angular range around the basic alignment of the receiving antennas, have a particularly disturbing effect on the evaluation of the received signals, that is to say in particular on the determination of the location and/or the speed of the object. This applies in particular to radar systems on motor vehicles which, for example, are operated at 24 GHz and are used, for example, as automatic proximity sensors for vehicles traveling in front, generally in the same lane.

SUMMARY OF THE INVENTION

The present invention is thus based on the object of improving the detection by means of the receiving antennas in terms of unambiguity and signal beam formation.

In order to achieve this object, a method of the type mentioned initially is distinguished according to the invention in that the distance is chosen such that the boundaries of the unambiguity area intersect the sidelobes, and in that the reflective object is detected by means of vectorial addition of the signals from the receiving antennas.

In order to achieve the object, an apparatus of the type mentioned initially is also distinguished by a distance between the receiving antennas by which the boundaries of the unambiguity area intersect the sidelobes and by a stage for vectorial addition of the signals received by the receiving antennas.

The present invention is based on a new criterion for adjustment of the distance between the receiving antennas for angle measurement. The distance is set such that the boundaries of the unambiguity area pass through the (first, which cause disturbance in their own right) sidelobes of the sensitivity curve of the receiving antennas. In consequence, a relatively large unambiguity area is generated. As a result of the vectorial addition of two received signals, those signal components which originate from objects in the basic alignment or in a narrow angle around the basic alignment and thus do not lead to any significant phase shift have their amplitudes added completely. In contrast, the signal components from objects which are located at the boundaries of the unambiguity area lead to a phase shift of $\pi$ (180°), so that the signal components of the boundaries of the unambiguity area, that is to say the signal components from the sidelobes, are subtracted from one another so that—assuming that the receiving antennas are essentially identical—they cancel one another out or at least attenuate one another to such a considerable extent that these signal components no longer play a significant role. The vectorial sum of the received signals is accordingly used for evaluation of the position and/or the speed of the object on which the signals are reflected, thus resulting in a received signal which corresponds to considerably improved beam forming in the basic alignment, and in which case signal components which would otherwise have a disturbing effect as a result of their increased sensitivity are eliminated from the sidelobes.

The choice according to the invention of the distance between the receiving antennas on the one hand and the evaluation of the vectorial sum of the received signals on the other hand results in an improved signal being available for evaluation, no longer having the disturbing components of the sidelobes.

The basic alignments of the receiving antennas are expediently parallel to one another.

For the method according to the invention and for operation of the apparatus according to the invention, it is expedient for a transmission signal if the transmitting antenna is used to form a transmission signal composed of at least two signal elements, which are formed from numerous signal sections at a frequency which is shifted through in each case one frequency step with respect to the previous signal section, the signal sections of which signal elements are transmitted alternately and extend over a predetermined modulation range. The use of a transmission signal such as this and its suitability for determination of the location and the speed of the reflective object are described in DE 100 50 278 A1, whose disclosure is referred to here. The transmission signal is preferably formed from three signal elements.

For the physical design of the apparatus according to the invention, it is advantageous for the antennas to be planar antennas, which are preferably formed from antenna patches arranged in at least one row, with two parallel rows of antenna patches arranged alongside one another having been proven in practice. The basic alignment of the receiving antennas is at right angles to the plane of the antenna patches.

BRIEF DESCRIPTION OF THE DRAWINGS

The invention will be explained in more detail in the following text with reference to the attached drawings, in which.

DETAILED DESCRIPTION OF A PREFERRED EMBODIMENT OF THE INVENTION

Figure 2:
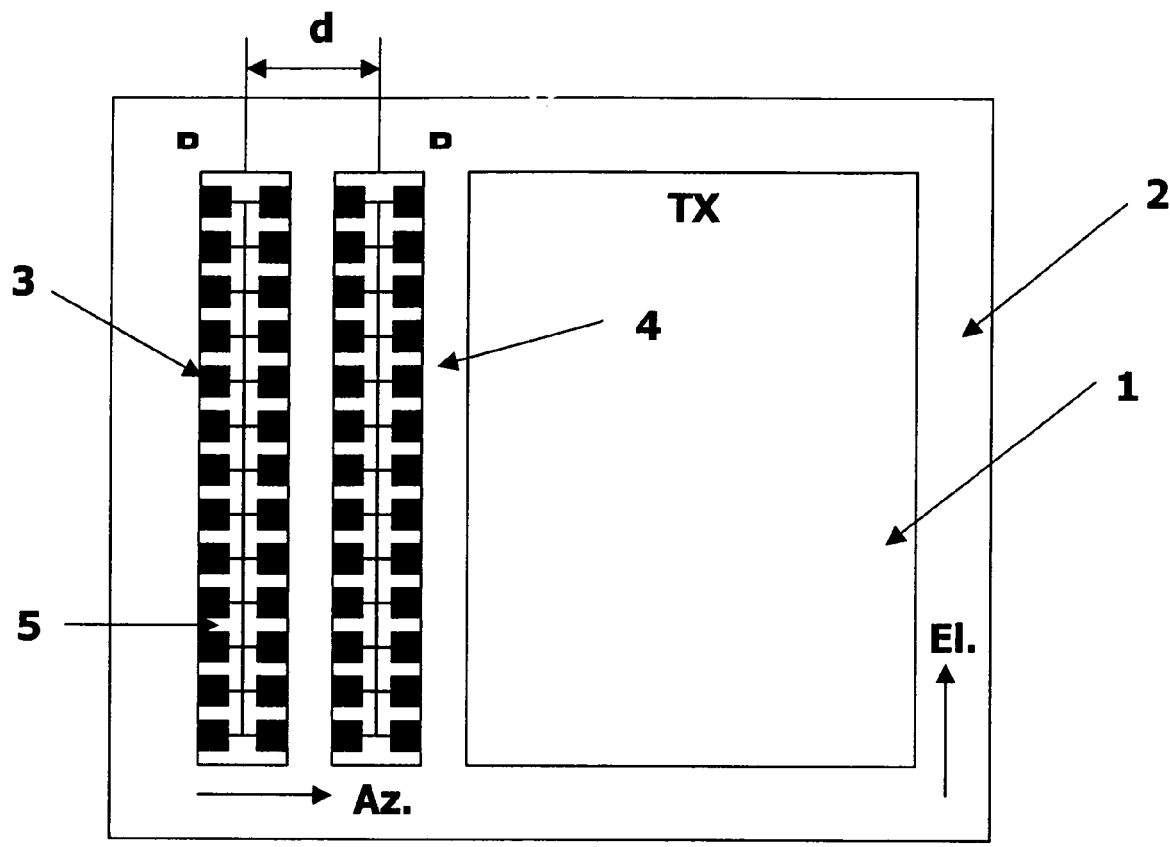
FIG. 2 shows a schematic plan view of one embodiment of an antenna arrangement of an apparatus according to the invention having one transmitting antenna and two receiving antennas.

FIG. 2 shows a front view of an antenna arrangement on a mounting plate 2. A transmitting antenna 1 (TX), which occupies a large area, is located on this, as well as two receiving antennas 3, 4, which are in the form of strips, are aligned parallel to one another and whose centers are separated by a distance d in the longitudinal direction.

Both the transmitting antenna 1 and the receiving antennas 3 and 4 are composed of a large number of regularly arranged small square antenna patches 5, which are connected to one another within the respective antenna 1, 3, 4. The technology of these antennas 1, 3, 4, which are formed from antenna patches 5, is known in the form of planar antennas. The plane of the planar antennas defines an azimuth angle and an elevation angle. The angle measurement for the azimuth angle is carried out about a reference line which runs parallel to the rows of antenna patches 5.

Figure 3:
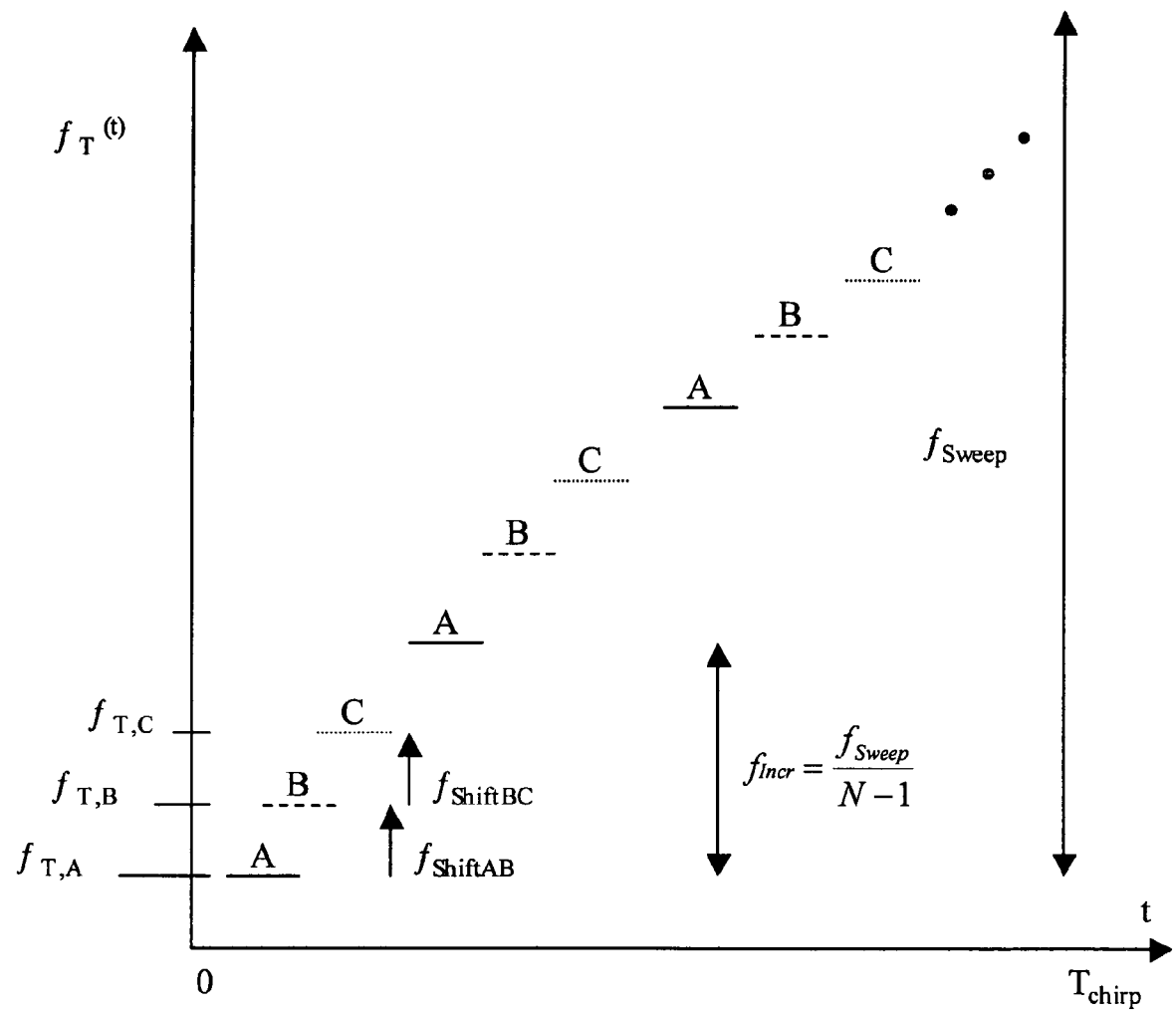
FIG. 3 shows a schematic illustration of a transmission signal that is used.

FIG. 3 illustrates the signal waveform of a transmission signal which is transmitted over a transmission time $t_{chirp}$ and is composed of three signal elements A, B, C. The signal elements are each composed of signal sections, which are each at a constant frequency $f_{T,A}$, $f_{T,B}$, $f_{T,C}$ for a short time. The signal sections which are associated with a signal A, B, C are in a frequency interval $$f_{incr} = \frac{f_{Sweep}}{N-1}.$$

The successively transmitted signal sections of the various signals A, B, C are respectively shifted through a frequency $f_{ShiftAB}$ or $f_{ShiftBC}$. The modulation range $f_{Sweep}$ is passed through in N steps by each signal A, B, C during the transmission time $t_{chirp}$ for the transmission signal. The use of a plurality of receiving antennas results in a corresponding number of received signals being obtained. The following text is based on the assumption of two receiving antennas, and the signals received there are:

Antenna I:

$m_{AI}(n); m_{BI}(n) m_{CI}(n); n=0 \ldots N-1,$

Antenna II:

$m_{AII}(n); m_{BII}(n) m_{CII}(n); n=0 \ldots N-1.$

As is known in the case of a monopulse receiver, the angle with respect to one or more objects can be determined by evaluation of the simultaneously sampled signals $m_{AI}(n)$ and $m_{AII}(n)$ from the two receivers with respect to the relative phase angle. This is generally carried out after transformation of the signals to the frequency domain.

| Antenna I:   |               |              |
|--------------|---------------|--------------|
| $m_{AI}(n)$  | $\rightarrow$ | $M_{AI}(K)$  |
| $m_{BI}(n)$  | $\rightarrow$ | $M_{BI}(K)$  |
| $m_{CI}(n)$  | $\rightarrow$ | $M_{CI}(K)$  |
| Antenna II:  |               |              |
| $m_{AII}(n)$ | $\rightarrow$ | $M_{AII}(K)$ |
| $m_{BII}(n)$ | $\rightarrow$ | $M_{BII}(K)$ |
| $m_{CII}(n)$ | $\rightarrow$ | $M_{CII}(K)$ | n=0 ... N−1, number of the sample value in the time domain; k=0 ... K−1, number of the spectral line in the frequency domain, where in general, K−N.

A plurality of objects (total number 0) o=0 ... O−1 can be detected from at least one spectrum.

As has been described in more detail in DE 100 50 278.4, the range R and the relative speed v of the object o (corresponding to the spectral line $K_{peak,RV}$) can be determined for the spectral line $K_{peak,RV}$ when at least $M_{AI}(K_{peak,RV})$ and $M_{BI}(K_{peak,RV})$ are used for calculation. The evaluation of the further signals $M_{CI}(K_{peak,RV})$
$M_{AII}(K_{peak,RV})$
$M_{BII}(K_{peak,RV})$
$M_{CII}(K_{peak,RV})$ is likewise possible for determination of R and v. This evaluation can improve the result, but is not absolutely essential.

The angle of the basic alignment of the antenna arrangement with respect to an object can be calculated, as is normal in the case of a monopulse receiver, by means of a phase difference measurement, for example from the spectra AI and AII but likewise at the position $K_{peak,RV}$:

$M_{AI}(K_{peak,RV}) = M_{AI}(K_{peak,RV}) \cdot e^{j\phi_{AI}(K_{peak,RV})}$ (complex value from the spectrum AI), $M_{AII}(K_{peak,RV}) = M_{AI}(K_{peak,RV}) \cdot e^{j\phi_{AII}(k_{peak,RV})}$ (complex value from the spectrum AII), $\Delta\phi_A(K_{peak,RV}) = \phi_{AI}(K_{peak,RV}) - \phi_{AII}(K_{peak,RV})$ phase difference from the spectra AI and AII.

The angle position of the object is given by:

$$\theta_\lambda(K_{peak,RV}) = \arcsin\left(\frac{\Delta\phi_A(K_{peak,RV}) \cdot \lambda}{2\pi \cdot d}\right)$$

In this case, λ is the wavelength and d is the distance between two receiving antennas used for measurement.

Figure 4:
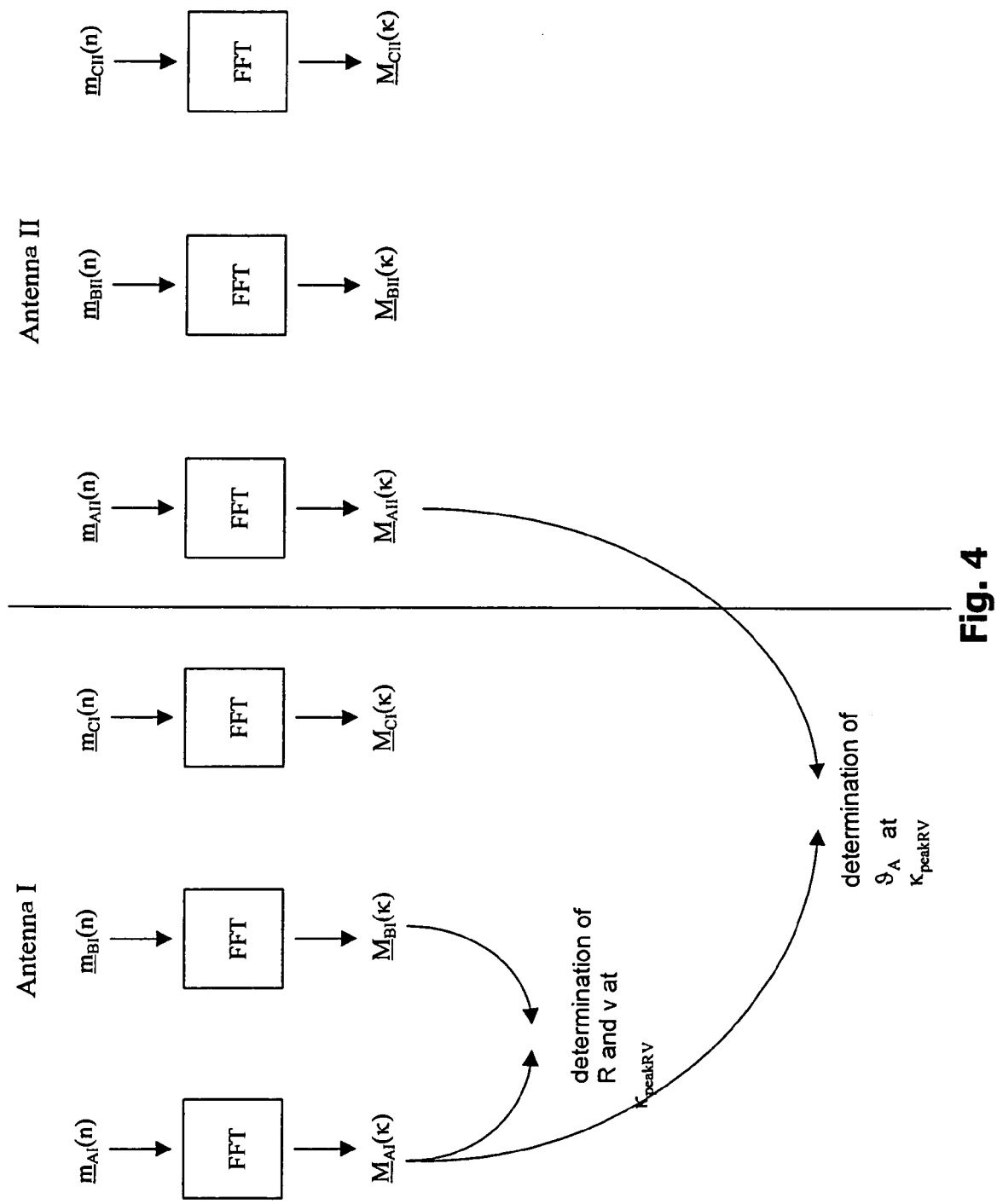
FIG. 4 shows a schematic illustration of the processing of the received signals from the two receiving antennas.

This determination process can be carried out for each object o=0 . . . O−1, to be precise at the spectral position ($K_{peak,RV}$) corresponding to the object. The procedure for the evaluation process is illustrated, once again in the form of a graph, in FIG. 4 with the steps described above.

As has been explained above, the angle can be determined uniquely only in an unambiguity area $\theta_u$ using the phase monopulse method. Outside this interval, a value of 2π must be added or subtracted to or from the measured phase difference Δϕ in order to determine the angle θ.

Figure 1:
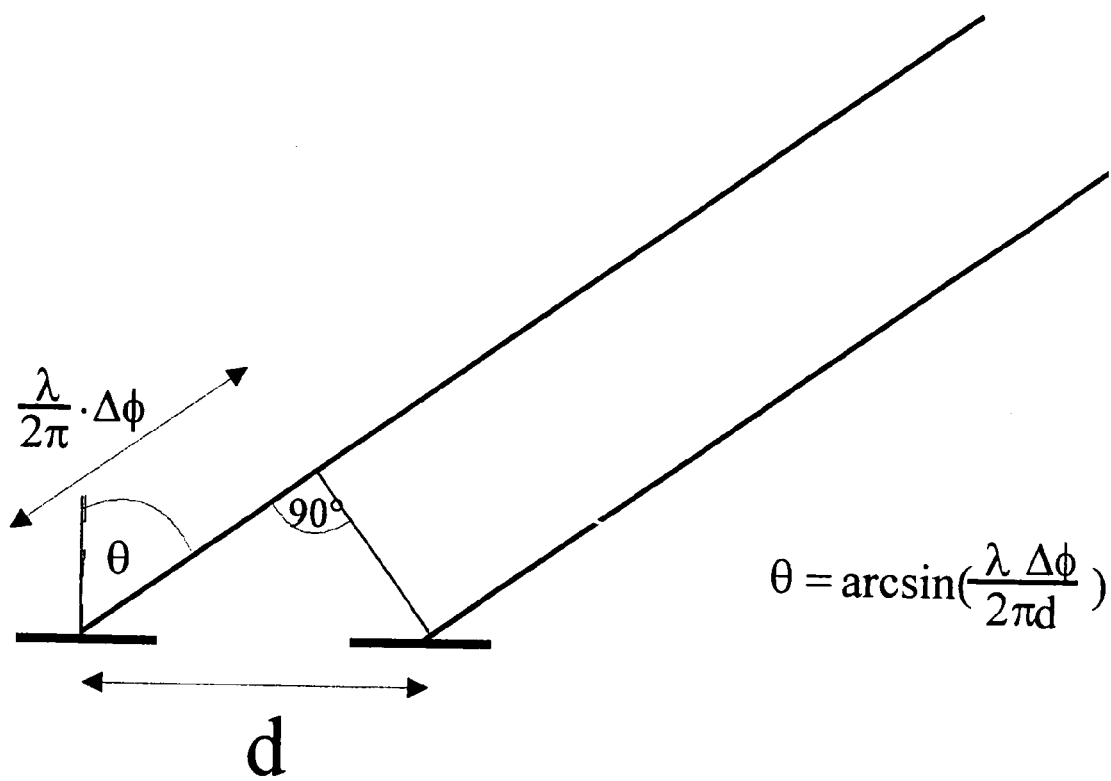
FIG. 1 shows a schematic illustration of angle determination from a measured phase difference between the received signals from two receiving antennas.
Figure 5:
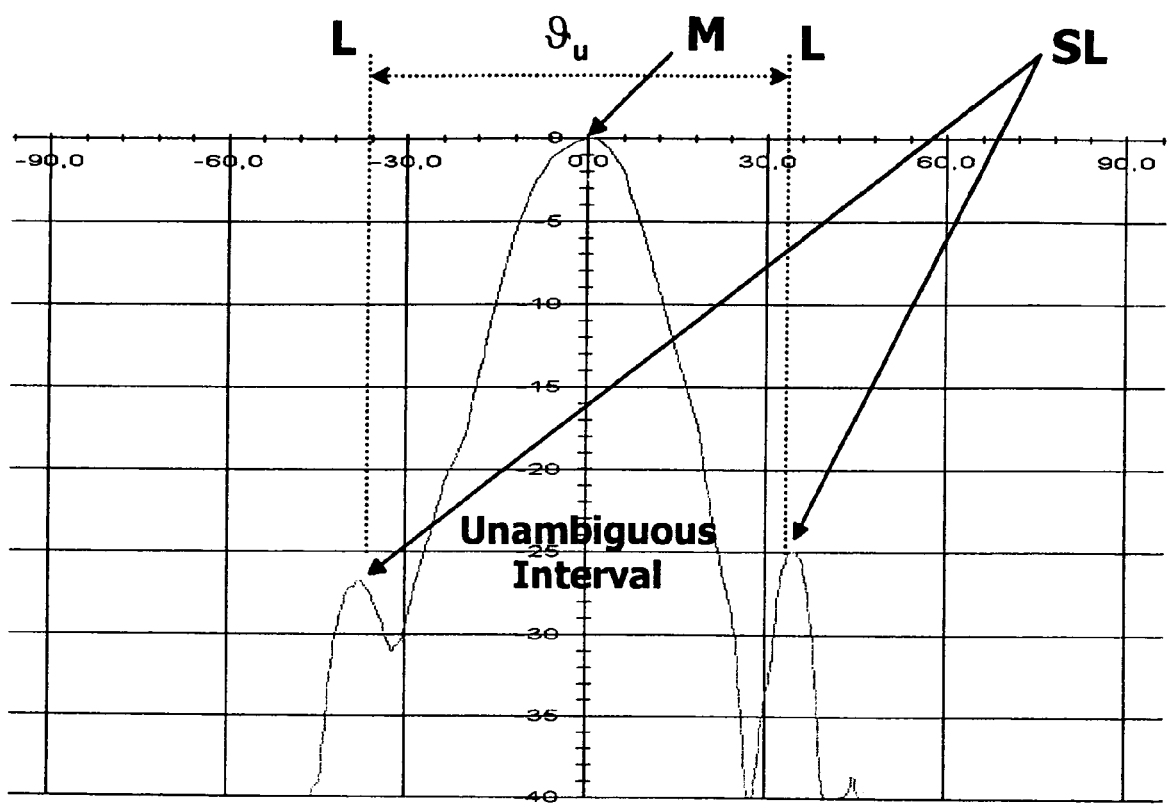
FIG. 5 shows an illustration of the boundaries, located according to the invention, of the unambiguity area for angle measurement.

FIG. 5 shows a sensitivity curve for one receiving antenna, which has a central maximum M in the basic alignment (0°) of the receiving antenna. Flanks fall approximately symmetrically from the maximum to a minimum, which occurs at an azimuth angle of around 30°. This is in each case followed by a sidelobe SL, which is at an azimuth angle between 35 and 40°. As described above, the unambiguity area $\theta_u$ is obtained from the distance d between the receiving antennas (FIGS. 1, 2). According to the invention, the distance d is chosen such that the boundaries L of the unambiguity area coincide with the sidelobes SL, preferably with the maxima of the sidelobes.

However, this means that the receiving antennas cannot be physically very large, that is to say they do not produce narrow beams. The receiving antennas thus have a broader characteristic than is actually desirable.

According to the invention, a vectorial addition of the complex received signals from the receiving antennas 3, 4 is carried out. The vectorial addition can be carried out both in the time domain and in the frequency domain. The addition process in the frequency domain is as follows (VS=vector sum)

$$M_{VS}(K_{peak,RV}) = M_{AI}(K_{peak,RV}) + M_{AII}(K_{peak,RV}).$$

The vectorial addition causes a maximum sensitivity of the antenna system resulting from constructive superimposition at the point at which the phase difference is zero, that is to say at the angle zero with respect to the basic alignment of the receiving antennas 3, 4.

Destructive superimposition results in the minimum sensitivity at the point at which the phase difference is π. According to the invention, this is the situation at the boundaries L of the phase-difference or angle interval. Since the boundaries L are located in the area of the sidelobes SL, the sidelobes SL are thus at least largely canceled out, thus suppressing undesirable reflections from the sidelobes. The determination of the location R and speed v at the point $K_{peak,RV}$ as explained in FIG. 4 can thus be carried out after the vectorial addition of the signals from the antennas I and II has been carried out, with improved beam forming.

The method according to the invention also allows the reception to be maximized in a direction other than the angle zero, of course, by applying a phase offset to at least one summand in the formation of the vector sum.

Sampling can be carried out in both real and complex form. The vector sum can be carried out in the time domain or frequency domain in the case of complex sampling, but only in the frequency domain for real sampling.

The method according to the invention is expediently carried out by arranging the transmitting antenna 1 and one of the receiving antennas 3, 4 on a board 2. The sensitivity curve for the receiving antenna (for example 4) which has already been produced is then measured. The distance d is then determined, which is required in order to make the boundaries L of the unambiguous interval $\theta_u$ coincide with the measured sidelobes SL, preferably positioning it at the maximum of the sidelobes SL. Once the distance d has been determined, the second receiving antenna 3 is fitted to the board, so that this then results in an antenna system according to the invention. In order to carry out the invention, the detection of objects is determined with the vectorial sum that has been formed of the mutually corresponding received signals from the antennas 3, 4, followed by determination of the parameters R, v.

The invention claimed is:

1. A method comprising the steps of:
   transmitting electromagnetic signals by a transmitting antenna,
   receiving the transmitted electromagnetic signals reflected by an object by means of at least two essentially identical receiving antennas,
   arranging said receiving antennas in a basic alignment and with a distance (d) from each other,
   using receiving antennas which each have a sensitivity characteristic over reception angles showing a maximum for a reception angle coinciding with the basic alignment, flanks initially falling with increasing reception angle from the basic alignment from said maximum to a minimum each, then with still increasing reception angle from the basic alignment forming first sidelobes having increasing sensitivities, said sidelobes being arranged symmetrically to said basic alignment,
   for measurement purposes, determining phase differences of the signals being reflected by an object and received by said at least two receiving antennas, said phase difference being unambiguous within a certain angle interval, said angle interval depending upon the distance (d) between the receiving antennas,
   wherein said distance (d) is chosen so that limits of the unambiguous angle interval intersect the first sidelobes, and wherein the signals received by the receiving antennas are vectorially added before the phase differences are determined.

2. The method as claimed in claim 1, wherein the basic alignments of the receiving antennas are parallel to one another.

3. The method as claimed in claim 1, wherein the transmitting antenna forms a transmission signal from at least two signal elements,
   the signal elements being formed from numerous signal sections, said signal sections having a frequency which is in each case shifted by one frequency step with respect to the previous signal section,
   the signal sections of said two signal elements are transmitted alternately and extend over a predetermined frequency range.

4. The method as claimed in claim 3, wherein the transmission signal is formed from three signal elements.

5. An apparatus comprising:
   a transmitting antenna for transmitting electromagnetic signals,
   at least two essentially identical receiving antennas having a basic alignment in a predetermined direction and being arranged with a distance (d) from each other,
   each receiving antenna having a sensitivity characteristic over reception angles showing a maximum for a reception angle coinciding with the basic alignment of said receiving antennas and having flank falling with increasing reception angle from the basic alignment from said maximum to a minimum each and, with further increasing reception angle from the basic alignment, forming first sidelobes having increasing sensitivities, said sidelobes being arranged symmetrically to said basic alignment, and a measurement device for determining the phase differences of the signals being reflected by an object and received by the at least two receiving antennas, the phase differences being determined unambiguously within a certain angle interval, said inteval being determined by the distance (d) between the receiving antennas, wherein said distance (d) is chosen so that limits of said certain angle interval intersect the first sidelobes, and wherein said measurement device comprises a device which for object detection purposes vectorially adds the signals received by the receiving antennas before the phase differences are determined.

6. The apparatus as claimed in claim 5, wherein the at least two receiving antennas are planar antennas.

7. The apparatus as claimed in claim 6, wherein the planar antennas have antenna patches arranged in at least one row.

8. The apparatus as claimed in claim 7, wherein the planar antennas each have two parallel rows of antenna patches arranged alongside one another.

* * * * *